US008356279B2

(12) United States Patent
Shogaki (10) Patent No.: US 8,356,279 B2
(45) Date of Patent: Jan. 15, 2013

(54) PROGRAM-GENERATING DEVICE AND METHOD, PROGRAM FOR IMPLEMENTING THE PROGRAM-GENERATING METHOD, AND STORAGE MEDIUM

(75) Inventor: Yohei Shogaki, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1061 days.

(21) Appl. No.: 12/058,726

(22) Filed: Mar. 30, 2008

(65) Prior Publication Data

US 2008/0244515 A1    Oct. 2, 2008

(30) Foreign Application Priority Data

Apr. 2, 2007    (JP) ................................ 2007-096547

(51) Int. Cl.
*G06F 9/44* (2006.01)
*G06F 9/45* (2006.01)
*G06F 15/16* (2006.01)
*G06F 3/00* (2006.01)
*G06F 15/00* (2006.01)

(52) U.S. Cl. ........ 717/115; 717/112; 717/143; 709/200; 715/700; 715/704; 715/706; 358/1.15

(58) Field of Classification Search .................. None
See application file for complete search history.

(56) References Cited

U.S. PATENT DOCUMENTS

| | | | | |
|---|---|---|---|---|
| 5,467,433 A | * | 11/1995 | Lamprecht et al. .......... | 358/1.15 |
| 6,046,741 A | * | 4/2000 | Hochmuth .................... | 715/704 |
| 6,335,795 B1 | | 1/2002 | Neuhard et al. | |
| 6,651,241 B1 | * | 11/2003 | Hernandez, III .............. | 717/115 |
| 6,941,523 B1 | * | 9/2005 | Mathieson .................... | 715/809 |
| 7,685,518 B2 | * | 3/2010 | Matsuda et al. .............. | 715/706 |
| 7,701,599 B2 | * | 4/2010 | Kumashio ..................... | 709/201 |
| 2002/0078337 A1 | | 6/2002 | Moreau et al. | |
| 2002/0089683 A1 | | 7/2002 | Moro et al. | |
| 2004/0141203 A1 | * | 7/2004 | Honma ......................... | 358/1.1 |

(Continued)

FOREIGN PATENT DOCUMENTS

FR    2 813 409 A1    3/2002

(Continued)

OTHER PUBLICATIONS

John F. Koegel et al., On the design of multimedia interchange formats, 1993 vol. 712/1993, 262-271, [Retrieved on Aug. 28, 2012]. Retrieved from the internet: <URL: http://www.springerlink.com/content/7631t63776h87223/fulltext.pdf> 10 Pages (262-271).*

Extended European Search Report issued in corresponding European Patent Application No. 08153978.5 dated Oct. 30, 2009.

*Primary Examiner* — Don Wong
*Assistant Examiner* — Anibal Rivera
(74) *Attorney, Agent, or Firm* — Rossi, Kimms & McDowell LLP (57) ABSTRACT

A program generating device configured to be capable of reducing an operation burden on the user who has conventionally been required to extract portions to be changed from a script. A script acquiring section acquires script information for execution of a predetermined process. An attribute information-acquiring section acquires attribute information representing conditions for operation of a control target of the program generating device. A difference extracting section extracts difference. A script correcting section changes the script information based on difference between the attribute information and the script information.

18 Claims, 5 Drawing Sheets

U.S. PATENT DOCUMENTS

| | | | |
|---|---|---|---|
| 2004/0158604 A1* | 8/2004 | Hepworth et al. | 709/200 |
| 2005/0027825 A1 | 2/2005 | Hikawa et al. | |
| 2005/0138557 A1* | 6/2005 | Bolder et al. | 715/700 |
| 2006/0080646 A1* | 4/2006 | Aman | 717/143 |
| 2006/0259367 A1* | 11/2006 | Sattler et al. | 705/26 |
| 2006/0259895 A1* | 11/2006 | Thibadeau | 717/115 |

FOREIGN PATENT DOCUMENTS

| | | |
|---|---|---|
| JP | 10-083263 A | 3/1998 |
| JP | 11-25185 A | 1/1999 |
| JP | 11-095955 A | 4/1999 |
| JP | 2005-084892 A | 3/2005 |

* cited by examiner

PROGRAM-GENERATING DEVICE AND METHOD, PROGRAM FOR IMPLEMENTING THE PROGRAM-GENERATING METHOD, AND STORAGE MEDIUM

BACKGROUND OF THE INVENTION

1. Field of the Invention

The present invention relates to a program-generating device and method, a program for implementing the program-generating method, and a storage medium, and more particularly to a program-generating device and method for generating a procedure program for executing a predetermined process based on processing condition information associated with at least one processing condition, a program for causing a computer to execute the program-generating method, and a storage medium storing the program.

2. Description of the Related Art

A conventional image-forming apparatus stores a script as a simple procedure program for executing an image-forming process or the like according to a plurality of processing conditions, and executes the image-forming process or the like by calling the script in response to a user instruction. Further, the script can include a procedure for a process other than the image-forming process.

When correction of an existing script is necessitated, an operator having an authority to make duplicates designates the script and gives a duplicating instruction to the image-forming apparatus so as to make a duplicate of the script. Upon reception of this instruction, the image-forming apparatus extracts information concerning the designated script from script management information stored in a server. Then, the image-forming apparatus changes a script identification ID in the script information to a new ID, and then modifies the script into a new script. Further, the image-forming apparatus generates a directory for the new script by duplicating and modifying directory information included in the designated script, and overwrites the script information with the name of the directory and the ID of the script as the source of the duplication. When all the overwrite operations are completed, the information is additionally registered in the script management information stored in the server (see e.g. Japanese Patent Laid-Open Publication No. H11-25185).

In the above-described conventional image-forming apparatus, however, when making a duplicate of the script and modifying the duplicate, portions other than the ID are modified by displaying areas containing information to be changed, and designating portions to be changed from the information displayed on the areas.

In this case, the user has to designate the portions to be changed from the information contained in the script, which is a burden to the user.

SUMMARY OF THE INVENTION

The present invention provides a program-generating device and method configured to be capable of reducing an operation burden on the user who has conventionally been required to extract portions to be changed from a script, a program for implementing the program-generating method, and a storage medium storing the program.

In a first aspect of the present invention, there is provided a program-generating device for generating a procedure program for executing a predetermined process based on processing-condition information associated with at least one processing condition, comprising a processing-condition-information-acquiring unit configured to acquire the processing-condition information including a procedure program generated by the program generating device, an attribute-information-acquiring unit configured to acquire attribute information relating to a user, and a changing unit configured to change the processing-condition information acquired by the processing-condition-information-acquiring unit based on a difference between the attribute information acquired by the attribute-information-acquiring unit and the processing-condition information acquired by the processing-condition-information-acquiring unit.

The procedure program can be a script.

The attribute information can be information indicative of a function restricted when the user uses an apparatus that executes the procedure program.

The program-generating device comprises a display unit configured to display difference information representing the difference between the attribute information acquired by the attribute-information-acquiring unit and the processing-condition information acquired by the processing-condition-information-acquiring unit, and an acquisition unit configured to acquire processing condition information input by the user, based on the difference information displayed on the display unit, wherein the changing unit changes the processing-condition information acquired by the processing-condition-information-acquiring unit to the processing-condition information acquired by the acquisition unit.

In the case that, based on the processing condition information and the attribute information, there is only one way that the difference information may be changed by the changing unit, the changing unit is adapted to change the processing-condition information without awaiting an input operation by the user.

In a second aspect of the present invention, there is provided a computer implemented method of generating a procedure program for executing a predetermined process based on processing-condition information associated with at least one processing condition, comprising a processing-condition-information-acquiring step of acquiring the processing-condition information including a procedure program generated by the program generating device, an attribute-information-acquiring step of acquiring attribute information relating to a user, and a changing step of changing the processing-condition information acquired by the processing-condition-information-acquiring step based on the difference between the attribute information acquired by the attribute-information-acquiring step and the processing-condition information acquired by the processing-condition-information-acquiring step.

The procedure program can be a script.

The attribute information can be information indicative of a function restricted when the user uses an apparatus that executes the procedure program.

The program-generating method further comprises a display step of displaying the difference information representing a difference between the attribute information acquired by the attribute-information-acquiring step and the processing-condition information acquired by the processing-condition-information-acquiring step, and an acquisition step of acquiring processing condition information input by the user, based on the difference information displayed by the display step, wherein the changing step changes the processing-condition information acquired by the processing-condition-information-acquiring step to the processing-condition information acquired by the acquisition step.

In the case that, based on the processing condition information and the attribute information, there is only one way that the difference information may be changed by the changing step, the changing step is adapted to change the processing-condition information without awaiting an input operation by the user.

In a third aspect of the present invention, there is provided a program for causing a computer to execute the program-generating method according to the second aspect of the present invention.

In a fourth aspect of the present invention, there is provided a storage medium storing the computer program according to the third aspect of the present invention.

According to the present invention, in executing a procedure program for executing a predetermined process based on processing condition information associated with at least one processing condition, the processing condition information is acquired. Further, attribute information representing conditions for operation of the control target of the program generating device is acquired. Then, the processing condition information is changed based on the difference between the acquired attribute information and the acquired processing condition information, and the procedure program is generated based on the changed processing condition information.

The features and advantages of the invention will become more apparent from the following detailed description taken in conjunction with the accompanying drawings.

DETAILED DESCRIPTION OF THE EMBODIMENTS

The present invention will now be described in detail with reference to the drawings showing preferred embodiments thereof.

Figure 1:
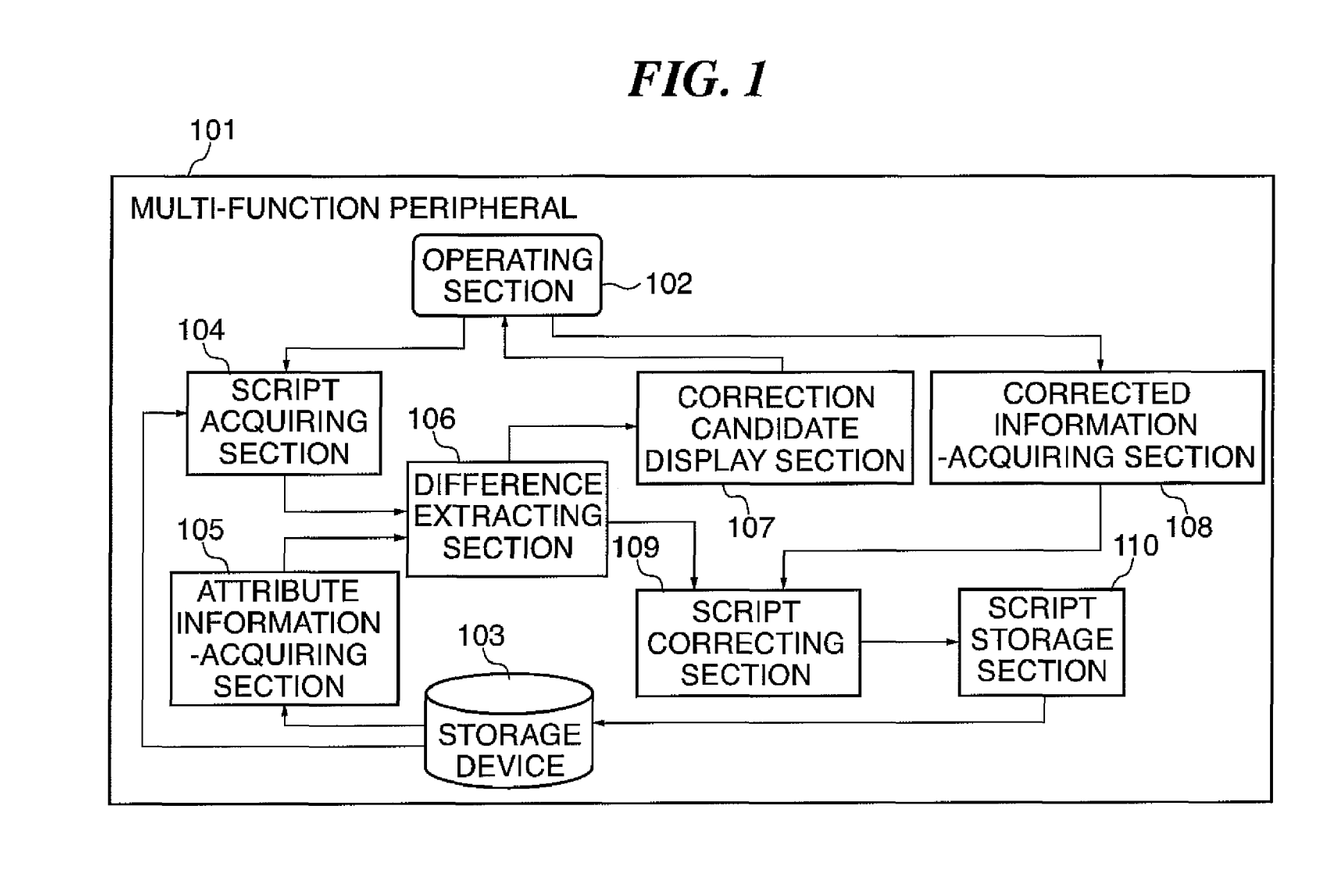
FIG. 1 is a block diagram of the whole arrangement of an image-forming apparatus including a program-generating device according to a first embodiment of the present invention.

FIG. 1 is a block diagram of the whole arrangement of an image-forming apparatus including a program-generating device according to a first embodiment of the present invention.

Figure 4:
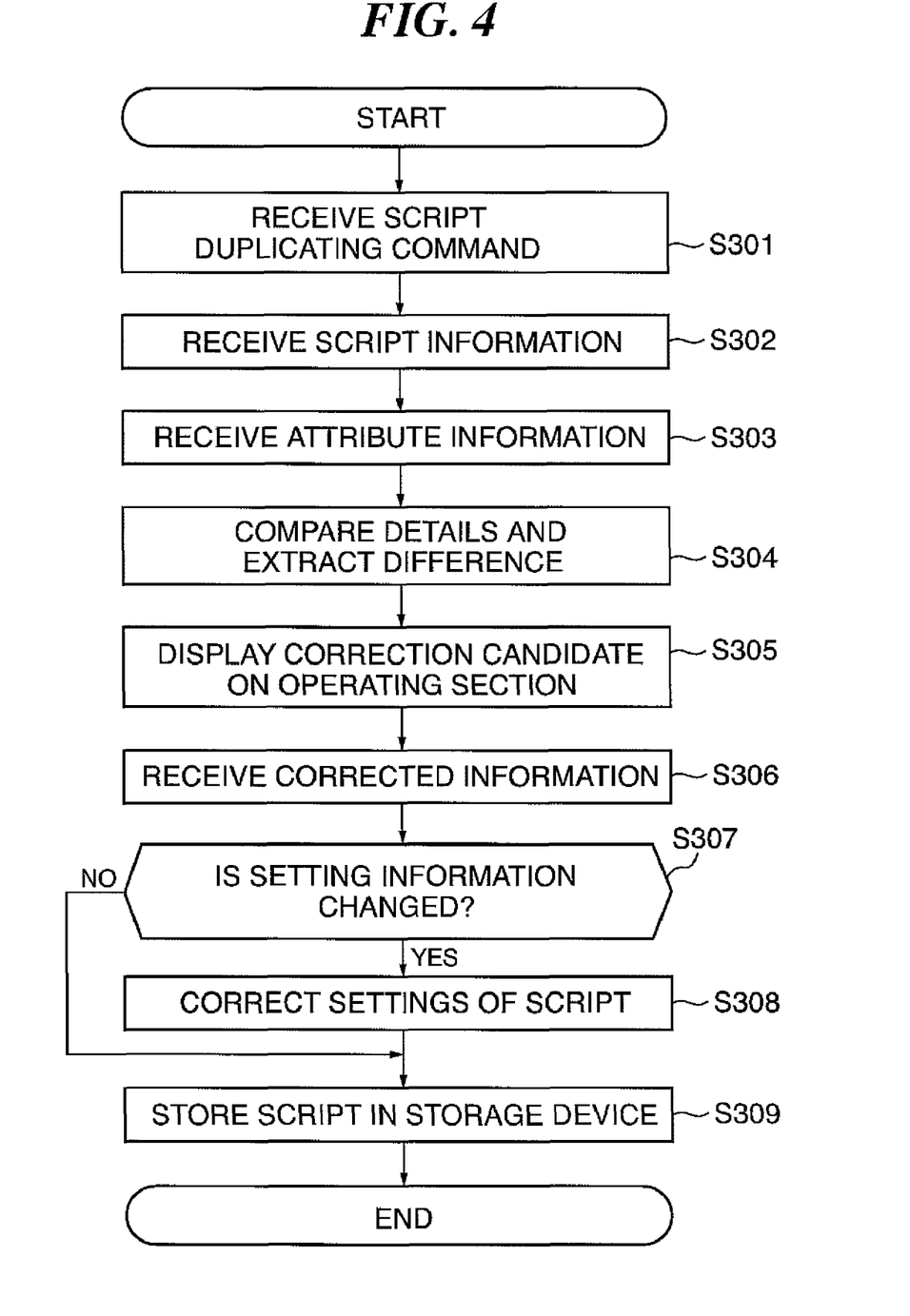
FIG. 4 is a flowchart of a script correction process executed by the program-generating device of the image-forming apparatus shown in FIG. 1.

The program-generating device according to the first embodiment includes a CPU (Central Processing Unit), a ROM (Read Only Memory) storing control programs, a RAM (Random Access Memory) used by the CPU for computation, and input/output devices, for example. The control programs are executed by the CPU, whereby the functions of respective sections 104 to 110 appearing in FIG. 1 are realized. In a particular embodiment the steps of the flow chart shown in FIG. 4 are carried out by the CPU. It should be noted that the above-mentioned image forming apparatus is implemented by a multi-function peripheral 101 by way of example.

Referring to FIG. 1, an operating section 102 is comprised of a liquid crystal display, a touch panel input device formed on the liquid crystal display, and a plurality of hard keys, none of which are shown, and provides user interface for various user operations. The operating section 102 is used to input/output predetermined information to/from the program-generating device (control unit) of the multi-function peripheral 101. For example, one script to be executed is selected from a plurality of scripts via the operating section 102, and an instruction is given for execution of the selected script via the operating section 102. A script is a simple procedure program for executing a predetermined process, such as a printing process, according to a plurality of processing conditions.

When the user selects a script and gives an instruction for executing the script, via the operating section 102, a script acquiring section 104 (processing condition information-acquiring unit) acquires script information, which will be described hereinafter with reference to FIG. 2, concerning the script selected for execution, from a plurality of pieces of script information stored in the multi-function peripheral 101. The pieces of script information are stored on a script-by-script basis in a storage device 103 provided in the multi-function peripheral 101. Although in the present embodiment, the pieces of script information are stored in the storage device 103 provided in the multi-function peripheral 101, this is not limitative. For example, the script information may be stored in an external information apparatus communicable via a network, such as a LAN, and users may be allowed to make use thereof by referring thereto.

Figure 2:
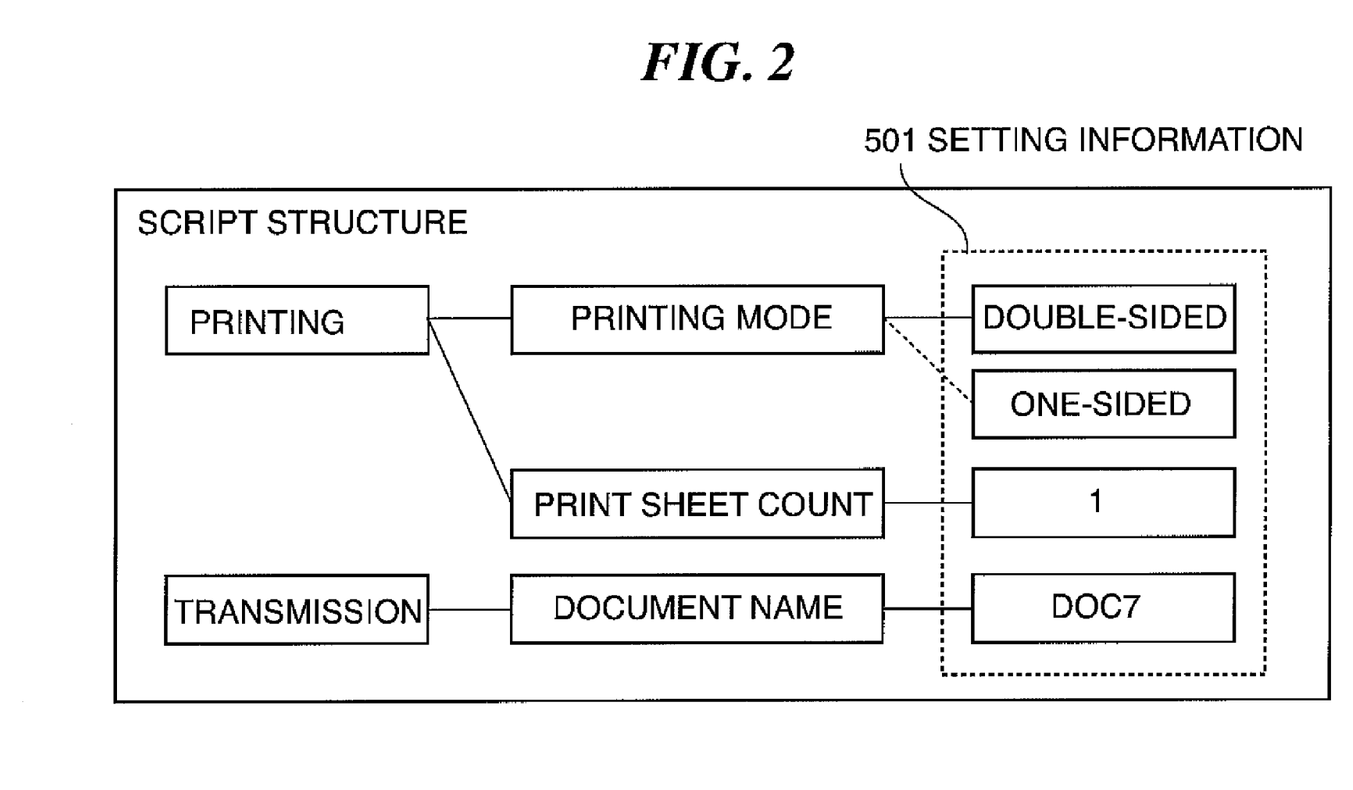
FIG. 2 is a block diagram showing an example of a script structure of script information stored in a storage device appearing in FIG. 1.

FIG. 2 is a block diagram showing an example of a script structure of the script information stored in the storage device 103 appearing in FIG. 1.

The script information shown in FIG. 2 by way of example includes procedure programs for executing two predetermined processes, i.e. a printing process and a transmission process. For the printing process, there are set a printing mode and a print sheet count, as two processing conditions. For the printing mode, one of a double-sided printing mode and a one-sided printing mode can be selected. In the illustrated example, the double-sided printing mode is selected for the printing mode, and the print sheet count (page count) is set to one sheet. On the other hand, for the transmission process, the document name of a document for transmission can be set as a processing condition, and in the illustrated example, a document DOC 7 is set. Setting information 501 contains specific selections and settings (processing condition information) concerning the printing mode, the print count, and the document name. The setting information 501 is acquired as script information by the script acquiring section 104.

Referring again to FIG. 1, the storage device 103 stores the above-described script information, and attribute information representing conditions for operation of the multi-function peripheral 101 as the control target of the program-generating device. An attribute information-acquiring section 105 acquires attribute information corresponding to the selected script from the storage device 103 and delivers the acquired attribute information to a difference extracting section 106. The attribute information includes user attribute information, device attribute information, and script attribute information. The attribute information-acquiring section 105 acquires a combination of a plurality of pieces of information from the user attribute information, the device attribute information, and the script attribute information, each formed by pieces of information.

The user attribute information concerns, out of a plurality of functions of the multi-function peripheral 101 as the control target of the program-generating device, ones permitted to be used on a user-by-user basis. For example, the user attribute information is comprised of attribute information indicative of printing restrictions, and it is determined, based on the printing restriction attribute information, whether or not the printing process can be executed. Specifically, the user attribute information represents pieces of information defined on a user-by-user basis whether or not color printing is allowed to be performed or whether or not staple processing is allowed to be performed. The user attribute information may represent any other attributes given to users, on a user-by-user basis, or attributes given to groups which users belong to, on a group-by-group basis. For example, the user attribute information may represent a transmission restriction attribute, a change restriction attribute, or a function availability restriction attribute.

The device attribute information concerns a plurality of functions of the multi-function peripheral 101 as the control target of the program-generating device. For example, the device attribute information represents device-specific attributes, such as a printable sheet size, whether the printing function is provided or the monochrome processing function alone is provided (referred to hereinafter as "distinction between the color printing function and the monochrome printing function"), whether or not post-processing functions, such as a stapling function, are provided, and whether or not communication functions, such as a facsimile function, are provided.

The script attribute information represents a printing mode, i.e. the double-sided printing mode or the one-sided printing mode, a document name, and a print sheet count (page count), for example.

In the present embodiment, the attribute information-acquiring section 105 is configured to acquire attribute information concerning a printing mode, a document name, a print sheet count (page count), a print sheet size, and distinction between the color printing function and the monochrome printing function, from the storage device 103.

Although in the present embodiment, the attribute information-acquiring section 105 acquires the attribute information from the storage device 103, an administrator may set attribute information, and the attribute information-acquiring section 105 may acquire the attribute information set by the administrator, instead of acquiring attribute information stored in the storage device 103. In this case, since the administrator sets the attribute information, it is possible to prevent processing of scripts containing personal information on transmission destinations and transmit documents from being executed without limitation.

Further, the attribute information to be set by the administrator is a set of correction candidate pieces of information selected from the attribute information stored in the storage device 103 and configured in advance such that they can be corrected by users, and be used as processing conditions (settings) after the correction.

The difference extracting section 106 compares the script information (setting information 501 in FIG. 2) acquired by the script acquiring section 104 with the attribute information acquired by the attribute information-acquiring section 105 to thereby extract difference between the script information and the attribute information. Then, the attribute information and the difference are delivered to a correction candidate display section 107, and the correction candidate display section 107 performs a display based on these on the operating section 102.

Figure 3:
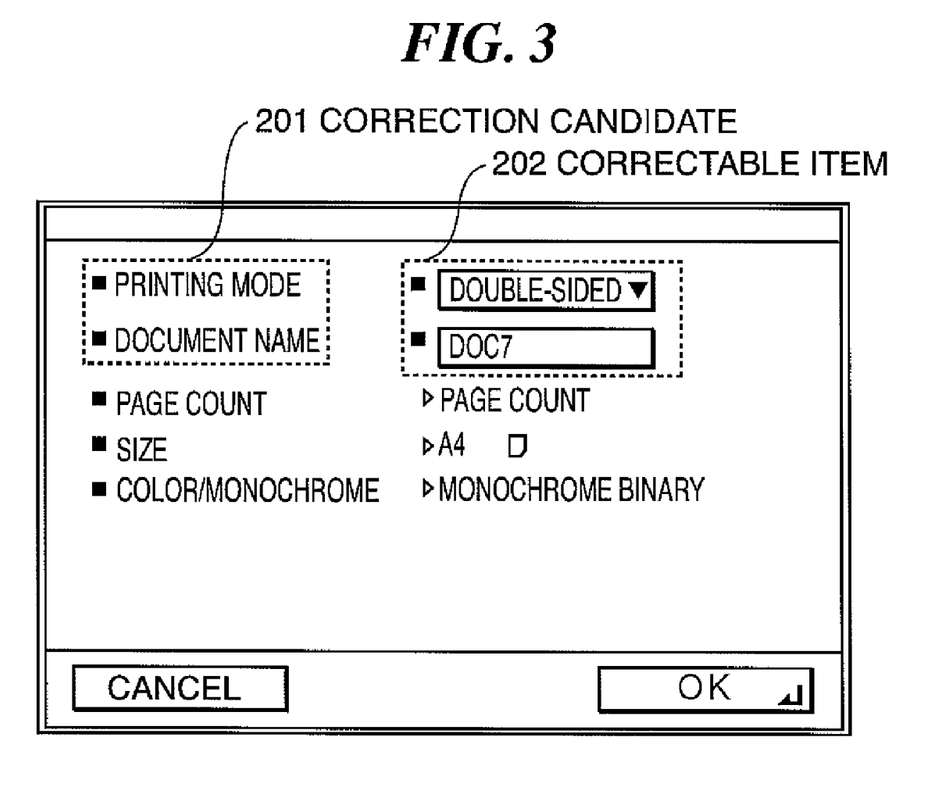
FIG. 3 is a view useful in explaining an example of difference between attribute information and script information, which is displayed on an operating section by a correction candidate display section appearing in FIG. 1.

FIG. 3 is a view useful in explaining an example of the difference between the attribute information and the script information, which are displayed on the operating section 102 by the correction candidate display section 107 appearing in FIG. 1.

As illustrated in FIG. 3 by way of example, the attribute information (the printing mode, the document name, the print sheet count (page count), the print sheet size, and the distinction between the color printing function and the monochrome printing function) acquired by the attribute information-acquiring section 105 is displayed on the screen of the operating section 102. At this time, pieces of the script information, which are different in respect of selections and settings from the corresponding ones of the attribute information, are displayed as correction candidates 201 and correction items 202. More specifically, in the illustrated example, the selections and settings of the printing mode and the document name in the script information are set to "double-sided" and "DOC7", which are different from the corresponding ones in the attribute information, so that only the printing mode and the document name set in the script information are displayed in a manner permitting correction. Thus, items required to be corrected (changed) are automatically extracted.

When the correction items 202 displayed on the operating section 102 by the correction candidate display section 107 are corrected (changed) by the user via the operating section 102, a corrected information-acquiring section 108 acquires corrected information (information on changed processing conditions) and delivers the corrected information to a script correcting section 109.

The script correcting section 109 makes a duplicate of the script to be processed (selected script), rewrites the script duplicate with the corrected information acquired by the corrected information-acquiring section 108, and sends the rewritten duplicate to a script storage section 110. The script storage section 110 stores the script duplicate having contents thereof corrected and sent from the script correcting section 109, as a new script in the storage device 103.

Although in the above-described embodiment, the corrected script duplicate is automatically stored in the storage device 103, this is not limitative. For example, a method may be employed in which the user is questioned as to whether or not the corrected script duplicate is to be stored, and as a result, if an instruction for storing the corrected script duplicate is received from the user, the script is stored in the storage device 103, whereas if an instruction for not storing the corrected script duplicate is received, the script is not stored in the storage device 103.

Next, a script correction process executed by the program-generating device of the multi-function peripheral 101 in FIG. 1 will be described with reference to FIG. 4.

FIG. 4 is a flowchart of the script correction process executed by the program-generating device of the multi-function peripheral 101 shown in FIG. 1.

It should be noted that in the following, a description will be given of a case where a script corresponding to the script information, shown in FIG. 2, in which the double-sided printing mode is set is to be executed, and the printing mode is set to "one-sided printing" in the user attribute information. The fact that the one-sided printing mode is set in the user attribute information means that the authority of the user to perform printing operations is restricted to one-sided printing.

In this case, if the script in which the double-sided printing mode is set is executed, since the user is not authorized to perform double-sided printing, an execution error is displayed on the operating section 102 of the multi-function peripheral 101, and the execution of the script is disabled.

Therefore, in order to execute the script, it is required to change settings. For this reason, the script correction process shown in FIG. 4 is executed.

First, a script duplicating command is received from the user via the operating section 102 (step S301).

When the script duplicating command is received, the script acquiring section 104 acquires script information on a script to be processed, from the storage device 103 (step S302). In the present example, the script information, shown in FIG. 2 by way of example, which contains the setting of execution of double-sided printing, is acquired.

Next, the attribute acquiring section 105 acquires attribute information from the storage device 103 (step S303). In the present example, the attribute information in which the one-sided printing mode is set is acquired.

Based on the script information acquired by the script acquiring section 104 and the attribute information acquired by the attribute acquiring section 105, the difference extracting section 106 extracts difference between the two pieces of information (step S304). In the present example, the double-sided printing mode is set in the script to be processed, whereas in the attribute information, the one-sided printing mode is set as a printing mode the user is allowed to execute. Therefore, the items "printing mode" and "double-sided printing" are extracted as a difference. In short, it is judged that correction of the printing mode set to "double-sided printing" is required so as to enable execution of the script.

The items "printing mode" and "double-sided printing" extracted as the difference are displayed as a correction candidate 201 and a correction item 202 (see FIG. 3) on the operating section 102 by the correction candidate display section 107 (step S305).

In the step S305, the user views a screen shown in FIG. 3 and changes "double-sided printing" to "one-sided printing". This correction may be performed either by entering the corrected setting in the correction items 202 or by selecting the corrected setting from a plurality of corrected setting candidates ("double-sided printing" and "one-sided printing" in the present example). In the latter case, options the user cannot select should be removed from the correction candidates 202 so as not to display the options for user selection. For example, the program-generating device causes "double-sided printing" not to be displayed as a corrected setting candidate for users or image-forming apparatuses that are not capable of performing double-sided printing.

It should be noted that other attribute information items than the difference extracted by the difference extracting section 106 are simultaneously displayed in the screen shown in FIG. 3. This makes it possible to confirm the settings of the attribute information with ease.

Further, the program-generating device may be configured such that pieces of the attribute information other than the difference can be corrected.

Thereafter, when the user corrects the correction item 202 via the operating section 102, the corrected information-acquiring section 108 acquires the corrected information ("one-sided printing" in the present example) (step S306). The script correcting section 109 determines, based on the corrected information, whether or not the setting information 501 (see FIG. 2) has been changed (step S307). If the setting information 501 has been changed, the process proceeds to a step S308, whereas if not, the process proceeds to a step S309.

In the step S308, the script correcting section 109 makes a duplicate of the script to be processed, and rewrites the script duplicate with the corrected information acquired by the corrected information-acquiring section 108. At this time, author information, script identification ID information, and genera- tion date information in the script duplicate are updated. Then, the script duplicate having the information corrected is sent to the script storage section 110.

In the following step S309, the script storage section 110 stores the script duplicate having the information corrected, as a new script, in the storage device 103, followed by terminating the correction process.

Thus, the unexecutable script is corrected to an executable state and is stored as a new script.

Although the script information shown in FIG. 2 contains the items "printing mode", "print sheet count", and "document name" by way of example, any other item may be contained in the script information insofar as the multi-function peripheral 101 is capable of setting the item for script registration. For example, items, such as "transmission destination", "print size", "document resolution", "document page count", "enabling/disabling of stapling", "staple position", "document combining method", and "enabling/disabling of image display during script execution", may be contained.

Further, although in the present embodiment, the attribute information is acquired after acquisition of the script information as shown in FIG. 4, this is not limitative, but the script information may be acquired after acquisition of the attribute information.

Furthermore, although in the present embodiment, duplication of the script is performed immediately before correction of the script information, this is not limitative, but the script may be duplicated immediately after acquisition of the script information. Alternatively, the original script may be corrected and stored as a new script without overwriting. In short, script duplication can be performed in any timing.

Next, a description will be given of a program-generating device according to a second embodiment of the present invention.

The configuration of the second embodiment is basically the same as that of the first embodiment. Therefore, duplicate description of components corresponding to those of the first embodiment is omitted by designating them using the same reference numerals, and only different points from the first embodiment will be described.

In the first embodiment, the difference extracting section 106 extracts difference and displays the difference on the operating section 102 as correction candidates 201 and correction items 202, and the user viewing the display carries out correction.

When correcting the correction items 202, if only one piece of corrected information (change candidate) can be selected by the user, the user has no choice, and hence the correction item 202 may be automatically corrected without waiting for the user to select the corrected information.

In the second embodiment, when there is only one corrected information (change candidate) the user can select, the correction item 202 is automatically corrected. For example, when the user is allowed to select only "one-sided printing" as a printing mode, and when a script has the double-sided printing mode as a piece of script information, there is no alternative but to change the printing mode to the one-sided printing mode, and hence the printing mode is changed to the one-sided printing mode. The script information of the corrected script is displayed such that the automatically corrected item is highlighted so that the user can recognize the same.

Alternatively, an inquiry as to whether or not to automatically change the correction item 202 may be displayed before execution of the automatic correction, and the correction item 202 may be corrected in response to an execution instruction from the user. This method makes it possible to prevent contents of the script from being automatically changed to undesired contents against the user's intention.

As described above, according to the second embodiment, it is not necessary to operate the correction candidate display section 107 and the corrected information-acquiring section 108 to correct a script requiring correction, which simplifies processing.

Next, a description will be given of a program-generating device according to a third embodiment of the present invention.

The configuration of the third embodiment is basically the same as that of the first embodiment. Therefore, duplicate description of components corresponding to those of the first embodiment is omitted by designating them using the same reference numerals, and only different points from the first embodiment will be described.

In the third embodiment, scripts are classified into shared scripts shared by all users and my-scripts only used personally by individual users. This will be described with reference to FIG. 5.

Figure 5:
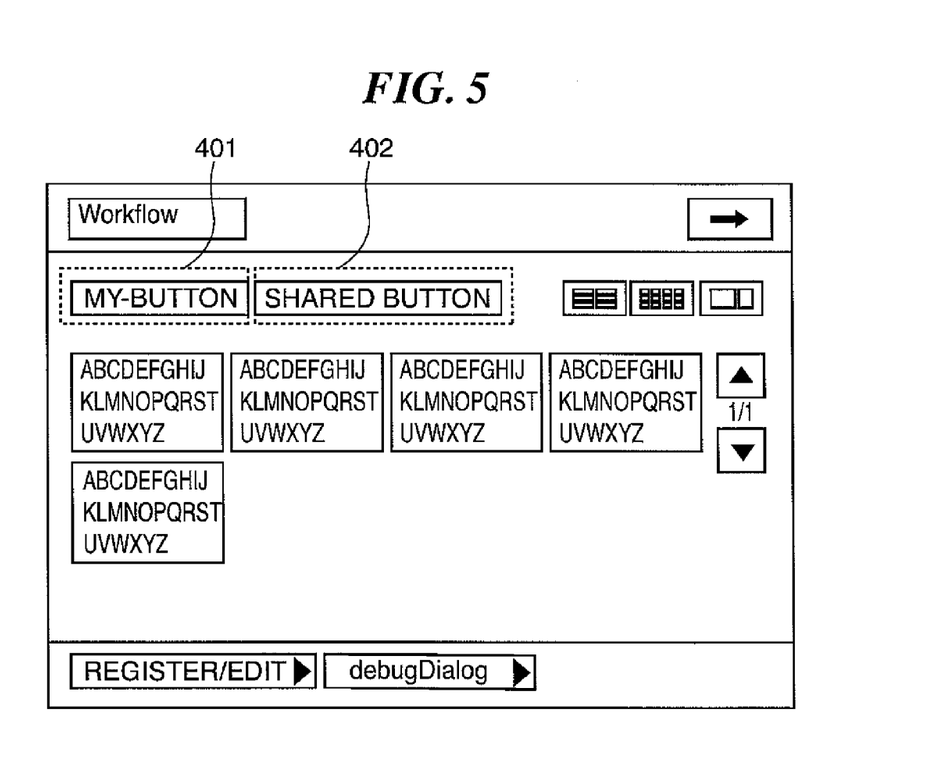
FIG. 5 is a view of a script list screen displayed on an operating section of a program-generating device according to a third embodiment of the present invention.

FIG. 5 is a view of a script list screen displayed on the operating section 102 of the program-generating device according to the third embodiment.

When a shared button 402 is pressed on the script list screen, shared scripts which can be shared with the other users are displayed as a list. On the other hand, when a my-button 401 is pressed, scripts for which the authority to execute is configured such that the individual user alone can personally use are displayed as my-scripts.

In the third embodiment, attribute information representing whether each script is a shared script or a my-script is added to each script (attribute adding unit), so as to make it possible to discern whether the script is a shared script or a my-script.

It should be noted that when one of the shared scripts is duplicated and the script duplicate is corrected, the corrected script is stored as a my-script. More specifically, when a shared script the user is not authorized to execute is corrected to an executable script, the corrected script is stored in an area storing a script list only the individual user is allowed to display.

Thus, according to the third embodiment, it is possible to prevent degradation of operability which occurs when numerous unexecutable scripts are displayed on the script list screen. Further, it is possible to generate a my-script by using a script set to a shared script as a template and adding detailed corrections suited to an individual user to the script, which saves time and labor required for generating a new script, and enhances operability.

Although in the above described embodiment, when an instruction for making a duplicate of a shared script is given, the script duplicate is simply corrected, this is not limitative. For example, the program-generating device may be configured to perform correction only when the corrected script is to be stored as a my-script, and not to perform correction when the corrected script is to be stored as a shared script.

Although in the above-described embodiments, the control target of the program-generating device is an image-forming apparatus, the target of control by the program-generating device is not limited to image-forming apparatuses. For example, the control target may be another apparatus on the network.

It is to be understood that the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above-described embodiments, and therefore the program code and the storage medium in which the program code is stored constitute the present invention.

Examples of the storage medium for supplying the program code include a floppy (registered trademark) disk, a hard disk, a magnetic-optical disk, an optical disk, such as a CD-ROM, a CD-R, a CD-RW, a DVD-ROM, a DVD-RAM, a DVD-RW, or a DVD+RW, a magnetic tape, a nonvolatile memory card, and a ROM. Alternatively, the program may be downloaded via a network.

Further, it is to be understood that the functions of any of the above described embodiments may be accomplished not only by executing the program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-096547 filed Apr. 2, 2007, which is hereby incorporated by reference herein in its entirety.

What is claimed is:

1. A program-generating device for generating a procedure program for executing a predetermined process based on at least one processing condition, the program-generating device comprising:

a computer system comprising a computer; and a memory device system comprising a memory device, the memory device system connected to the computer system and storing instructions configured to be executed by the computer system, the instructions comprising instructions for:

acquiring processing conditions associated with the generated procedure program;

acquiring attribute information associated with a user and indicating processing conditions that the user is allowed to execute;

identifying a correctable processing condition as one of the acquired processing conditions that is not allowed to be executed in the generated procedure program by the user based on a comparison of the acquired processing conditions and the attribute information; and displaying, with a display device, the correctable processing condition in a manner editable by the user that requires the user to select an alternate processing condition for the correctable processing condition, the alternate processing condition being a condition that the user is allowed to execute, according to the attribute information, wherein the instructions for acquiring the processing conditions and the instructions for acquiring the attribute information are for acquiring the processing conditions and the attribute information when the procedure program is instructed to be duplicated by the user.

2. The program-generating device according to claim 1, wherein the instructions for displaying comprise instructions for displaying, with the display device, the correctable processing condition in a highlighted manner as compared to a displayed one of the acquired processing conditions that is not identified as a correctable processing condition.

3. The program-generating device according to claim 1, wherein the instructions for displaying comprise instructions for displaying, with the display device, a plurality of alternate processing conditions user-selectable for the correctable processing condition, the plurality of alternate processing conditions comprising only processing conditions that the user is allowed to execute, according to the attribute information.

4. The program-generating device according to claim 1, wherein the generated procedure program is a script.

5. The program-generating device according to claim 1, wherein the instructions further comprise instructions for:
identifying a second correctable processing condition as one of the acquired processing conditions that is not allowed to be executed in the generated procedure program by the user based on a comparison of the acquired processing conditions and the attribute information, the second correctable processing condition having only a single alternate processing condition that the user is allowed to execute, according to the attribute information; and
automatically selecting the single alternate processing condition for the second correctable processing condition.

6. The program-generating device according to claim 1, wherein the instructions further comprise instructions for:
receiving a user-selection of the alternate processing condition for the correctable processing condition; and
generating a second procedure program based on the user-selected alternate processing condition.

7. A computer-implemented program-generating method for generating a procedure program for executing a predetermined process based on at least one processing condition, the program-generating method comprising the steps of:
acquiring processing conditions associated with the generated procedure program;
acquiring attribute information associated with a user and indicating processing conditions that the user is allowed to execute;
identifying a correctable processing condition as one of the acquired processing conditions that is not allowed to be executed in the generated procedure program by the user based on a comparison of the acquired processing conditions and the attribute information; and
displaying, with a display device, the correctable processing condition in a manner editable by the user that requires the user to select an alternate processing condition for the correctable processing condition, the alternate processing condition being a condition that the user is allowed to execute, according to the attribute information,
wherein the step of acquiring the processing conditions and the step pf acquiring the attribute information acquire the processing conditions and the attribute information when the procedure program is instructed to be duplicated by the user, and
wherein said steps are implemented by a computer system comprising a computer.

8. The computer-implemented program-generating method according to claim 7, wherein the step of displaying comprises displaying, with the display device, the correctable processing condition in a highlighted manner as compared to a displayed one of the acquired processing conditions that is not identified as a correctable processing condition.

9. The computer-implemented program-generating method according to claim 7, wherein the step of displaying comprises displaying, with the display device, a plurality of alternate processing conditions user-selectable for the correctable processing condition, the plurality of alternate processing conditions comprising only processing conditions that the user is allowed to execute, according to the attribute information.

10. The computer-implemented program-generating method according to claim 7, wherein the generated procedure program is a script.

11. The computer-implemented program-generating method according to claim 7, wherein the method further comprises the steps of:
identifying a second correctable processing condition as one of the acquired processing conditions that is not allowed to be executed in the generated procedure program by the user based on a comparison of the acquired processing conditions and the attribute information, the second correctable processing condition having only a single alternate processing condition that the user is allowed to execute, according to the attribute information; and
automatically selecting the single alternate processing condition for the second correctable processing condition.

12. The computer-implemented program-generating method according to claim 7, wherein the method further comprises the steps of:
receiving a user-selection of the alternate processing condition for the correctable processing condition; and
generating a second procedure program based on the user-selected alternate processing condition.

13. A non-transitory computer-readable storage medium storing a program configured to be executed by a computer system comprising a computer, the program for generating a procedure program for executing a predetermined process based on at least one processing condition, the program comprising instructions for:
acquiring processing conditions associated with the generated procedure program;
acquiring attribute information associated with a user and indicating processing conditions that the user is allowed to execute;
identifying a correctable processing condition as one of the acquired processing conditions that is not allowed to be executed in the generated procedure program by the user based on a comparison of the acquired processing conditions and the attribute information; and
displaying, with a display device, the correctable processing condition in a manner editable by the user that requires the user to select an alternate processing condition for the correctable processing condition, the alternate processing condition being a condition that the user is allowed to execute, according to the attribute information,
wherein the instructions for acquiring the processing conditions and the instructions for acquiring the attribute information are for acquiring the processing conditions and the attribute information when the procedure program is instructed to be duplicated by the user.

14. The non-transitory computer-readable storage medium according to claim 13, wherein the instructions for displaying comprise instructions for displaying, with the display device, the correctable processing condition in a highlighted manner as compared to a displayed one of the acquired processing conditions that is not identified as a correctable processing condition.

15. The non-transitory computer-readable storage medium according to claim 13, wherein the instructions for displaying comprise instructions for displaying, with the display device, a plurality of alternate processing conditions user-selectable for the correctable processing condition, the plurality of alternate processing conditions comprising only processing conditions that the user is allowed to execute, according to the attribute information.

16. The non-transitory computer-readable storage medium according to claim 13, wherein the generated procedure program is a script.

17. The non-transitory computer-readable storage medium according to claim 13, wherein the program further comprises instructions for:

identifying a second correctable processing condition as one of the acquired processing conditions that is not allowed to be executed in the generated procedure program by the user based on a comparison of the acquired processing conditions and the attribute information, the second correctable processing condition having only a single alternate processing condition that the user is allowed to execute, according to the attribute information; and automatically selecting the single alternate processing condition for the second correctable processing condition.

18. The program-generating device according to claim 13, wherein the program further comprises instructions for:

receiving a user-selection of the alternate processing condition for the correctable processing condition; and generating a second procedure program based on the user-selected alternate processing condition.

* * * * *